Dec. 9, 1941.       H. E. TAUTZ       2,265,408
TILTING ARBOR SAW MOUNTING
Filed April 22, 1939       2 Sheets-Sheet 1

INVENTOR
HERBERT E. TAUTZ
ATTORNEY

WITNESSES

Dec. 9, 1941.                H. E. TAUTZ                2,265,408
                     TILTING ARBOR SAW MOUNTING
                       Filed April 22, 1939            2 Sheets-Sheet 2
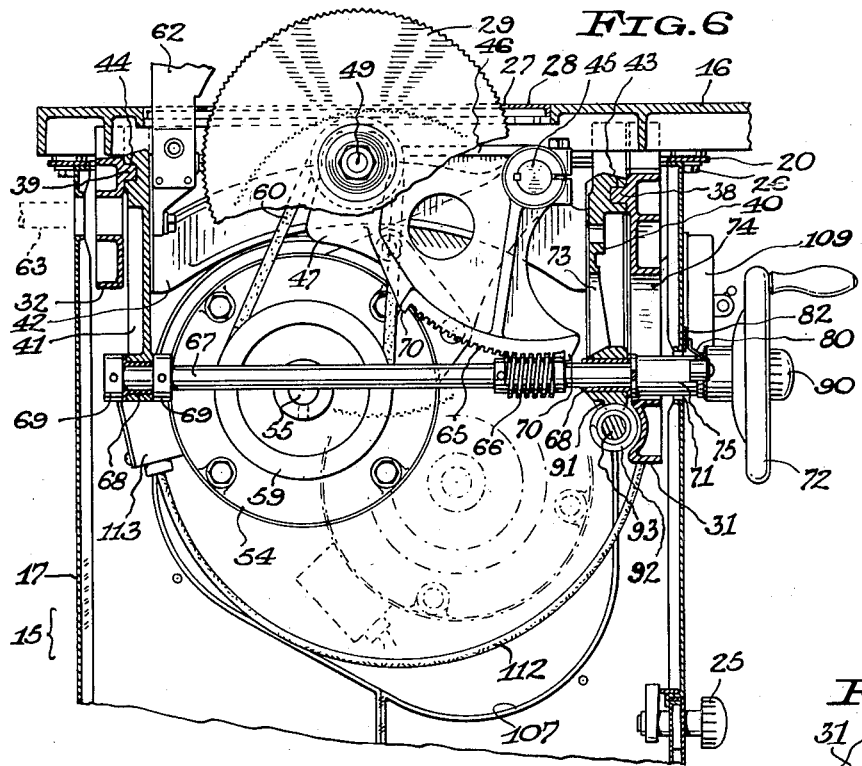
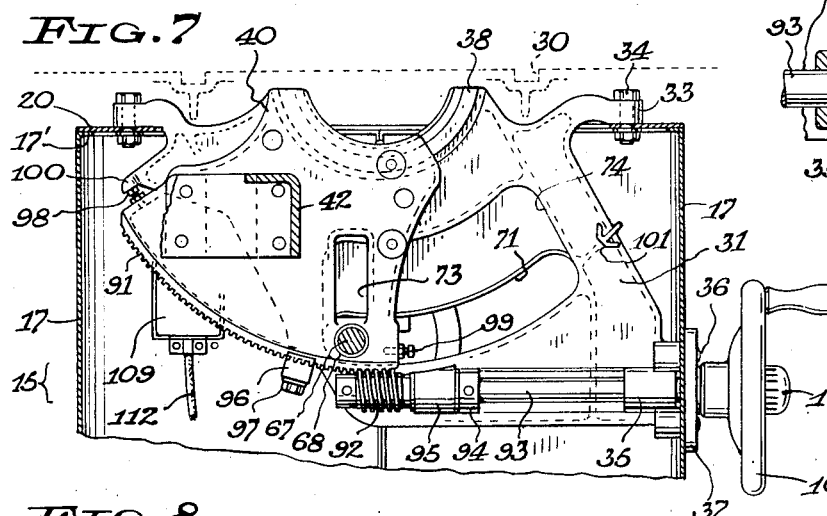
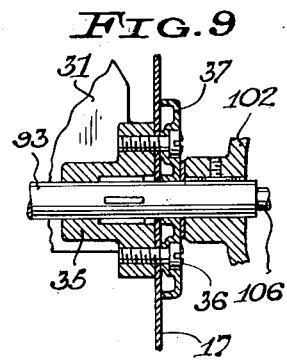
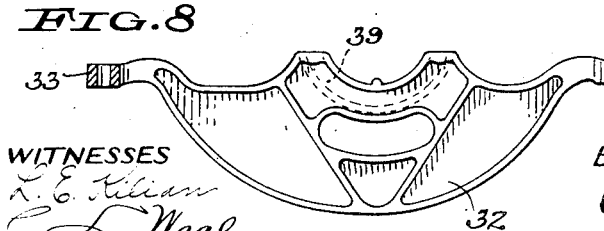
WITNESSES
INVENTOR
HERBERT E. TAUTZ
BY
ATTORNEY Patented Dec. 9, 1941

2,265,408

UNITED STATES PATENT OFFICE 2,265,408

TILTING ARBOR SAW MOUNTING

Herbert E. Tautz, Milwaukee, Wis., assignor to The Delta Manufacturing Company, Milwaukee, Wis., a corporation of Wisconsin Application April 22, 1939, Serial No. 269,343

2 Claims. (Cl. 143—36)

This invention relates to machine tools and more particularly to mountings for circular saws and the like.

An object of the invention is to provide a machine tool having improved supporting means of strong, rigid and inexpensive construction adapted for tiltably mounting a circular saw or other tool element.

Another object is to provide a machine tool having an improved form of trunnion construction which is capable of simple but firm securement to a machine cabinet or frame, and which will facilitate assembly of the machine and maintain the tiltable tool element against misalignment.

The invention further consists in the several features hereinafter described and claimed.

In the accompanying drawings, wherein by way of example the invention is shown to be embodied in a circular saw of the tilting arbor type:

Fig. 6 is a sectional elevation taken generally along the line 6—6 of Fig. 1, a lowered position of the saw and its driving motor being indicated in dotted lines;

Fig. 7 is a sectional elevation taken generally along the line 7—7 of Fig. 2;

Fig. 8 is a detail view of a rear trunnion bracket of the machine, and

Fig. 9 is a detail sectional elevation taken generally along the line 9—9 of Fig. 4.

Figure 5:
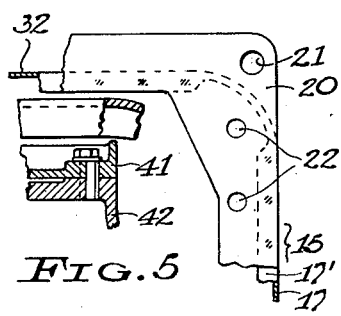
Fig. 5 is a detail plan view of a corner portion of the machine with the table removed, parts being broken away and parts being shown in section.

In the drawings, 15 designates an upright tubular box-like casing which forms a main frame on which is mounted a work-supporting table or platform 16. The casing is here shown to be of the type disclosed in my copending application for Machine cabinets, Serial No. 245,199, filed December 12, 1938, and comprises vertical side walls formed by four marginally flanged sheet metal panels 17 of angular shape rigidly secured together, as by spot welding, the vertical joints between the casing panels extending centrally along the side walls, and each panel being bent to its angular shape and having a rounded corner. A sheet metal bottom plate 18 is rigidly secured to the inwardly flanged lower edges of the panels, and feet 19 are rigidly secured to the corner portions of the bottom plate. A flat sheet metal top plate or gusset plate 20, preferably of heavier stock than the cabinet side walls, rests on and is rigidly spot welded to the inwardly flanged upper edges 17' of the casing side walls, and is in the form of a rectangular loop. The top plate presents an accurate flat top surface for mounting various members hereinafter described, and is provided adjacent to its corner portions with bolt-receiving openings 21 and 22, Fig. 5. The front and rear edges of the top plate project outwardly from the cabinet walls. The various parts of the cabinet are held in suitable jigs during attachment, so as to provide accurate assembly.

The front wall of the cabinet is provided at its lower portion with an opening 23 for a removable door 24 to permit the removal of sawdust or other debris, the door having a suitable lock 25.

The work-supporting table or platform 16, which is suitably ribbed on its underside, rests on the corner portions of the top plate 20 and is detachably secured thereto by screws 26 passing through the openings 21. The machine illustrated is a tilting arbor circular saw, and the table is accordingly provided with the usual saw slot 27, preferably formed in a detachable insert plate 28, to receive therethrough a circular saw blade 29. The table also has the usual guideways 30 extending parallel to the saw blade, and is capable of a slight angular adjustment on the cabinet top plate 20 to secure such parallelism, this adjustment being effected before the screws 26 are fully tightened. The table and cabinet provide a mutual bracing effect so as to improve the rigidity of the machine.

A pair of apertured front and rear frame members or trunnion brackets 31 and 32, respectively, are placed in the cabinet near the front and rear walls thereof, each bracket having flat-bottomed ears 33 at opposite ends resting on the horizontal top plate 20 of the frame-forming cabinet and rigidly secured thereto by bolts 34 passing through the top plate openings 22. One of the ears on the rear bracket, 32, is here shown to be widened, Fig. 2, and to be fastened by two bolts, so as to prevent any tendency toward tipping. At its lower portion, the front trunnion bracket, 31, has a bearing projection 35 which abuts against the inner face of one of the vertical side walls of the cabinet and which is secured thereto by screws 36, these screws also passing through a clamping plate 37 at the outer face of this side wall, and the clamped portion of the trunnion bracket being located adjacent to a corner portion of the cabinet. Each trunnion bracket is formed by an approximately flat plate-like casting which is suitably ribbed at its outer side, the configuration of each bracket being such as to permit inexpensive production. The front bracket, 31, has a machined arcuate trunnion rib or bearing segment 38 at its inner side, and the rear bracket, 32, has a similar rib 39 of somewhat shorter radius. These bearing ribs are concentric about an axis extending approximately in the plane of the table top and in the plane of the saw blade, this axis being parallel to the plane of the flat top surface of the cabinet top plate 20.

Figure 2:
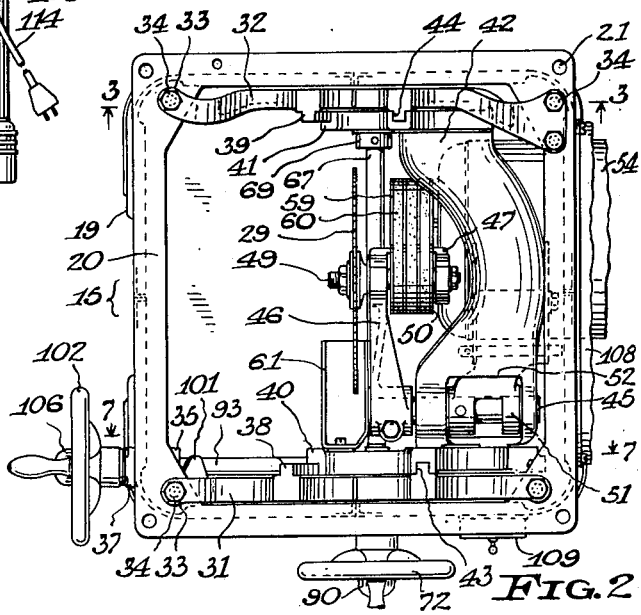
Fig. 2 is a top view of the saw with the table thereof removed, and parts being broken away.
Figure 3:
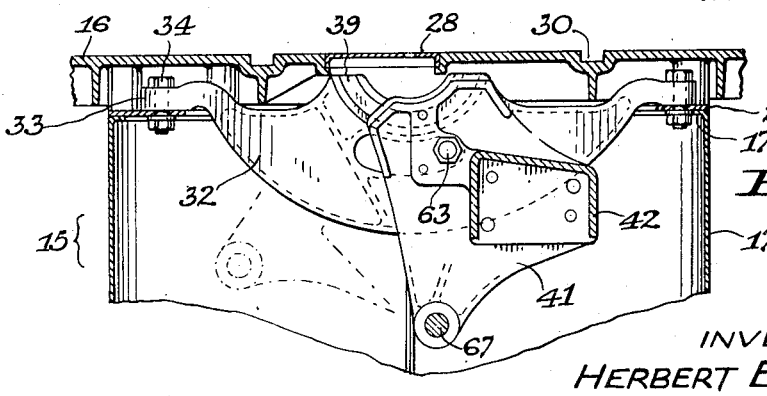
Fig. 3 is a sectional elevation taken generally along the line 3—3 of Fig. 2.

Between the trunnion bracket 31 and 32 is mounted a carriage or cradle which comprises front and rear trunnions 40 and 41, respectively, rigidly connected by an arched yoke 42, the trunnions having arcuate grooves 43 and 44, respectively, in which the bearing ribs 38 and 39 slidably fit to firmly support the carriage and to define a horizontal pivotal axis for the carriage extending approximately in the plane of the table top and in the plane of the saw blade. The trunnions are in the form of ribbed plate-like castings which can be inexpensively produced, and are screwed and doweled to the opposite ends of the yoke 42, the yoke ends presenting flat parallel faces which abut the inner faces of the trunnions. The arched yoke is also curved to space its intermediate portion away from the saw blade, as seen in Fig. 2, and is of inverted channel cross-section, Fig. 3.

A rock shaft 45 is journalled in spaced bearings formed in the front portion of the yoke and has its axis parallel to the axis of rotation of the saw blade. An arm or bracket 46 has a split hub portion keyed and clamped on a projecting end of the rock shaft 45. A saw arbor 49 is journalled in the forked free end 47 of the arm 46 and detachably carries the saw blade 29, and a multiple-grooved pulley 50 is secured on the arbor between the journalled portions of the arbor. The arm 46 is axially shiftable on the rock shaft 45 to center the saw blade with respect to the carriage axis and the table saw slot.

A motor arm or bracket 51 has a hub portion rigidly keyed and secured on an intermediate portion of the rock shaft 45 and fits in an opening 52 formed in the yoke 42 between the shaft bearings, thus confining this bracket and the rock shaft against axial displacement. The free end of the motor bracket adjustably carries an electric motor 54, the motor shaft 55 being parallel to the rock shaft 45. The motor shaft carries a multiple-grooved pulley 59 which is drivingly connected to the arbor pulley 50 by multiple V-belts 60, the tension on the belts being adjusted by shifting the motor on the arm 51. The motor mounting is more particularly disclosed in my copending application for Tilting arbor saws, Serial No. 252,744, filed January 25, 1939.

The front trunnion, 40, carries a suitable sawdust guard 61, and the rear trunnion carries a detachably mounted splitter 62, Fig. 6, which extends upwardly through the slotted insert plate 28. If desired, the rear trunnion may also carry an extension rod 63, Fig. 6, for supporting a splitter or guard, or both (not shown), the rod being adapted to pass through apertured portions of the rear casing wall and rear trunnion bracket and to be clamped to the rear trunnion 41.

The saw arbor and motor are raised and lowered by a sector gear 65 on the lower portion of the arbor arm 46, Fig. 6, meshing with a worm 66 fast on a horizontal shaft 67 journalled in self-lubricating or oil-impregnated bushings 68 in the front and rear trunnions, the shaft extending parallel to the tilting axis of the carriage and being confined against axial displacement by shaft collars 69 engaging the rear trunnion. The teeth of the sector gear are skewed, but not curved, so as not to interfere with axial adjustment of the arbor arm 46 on which the gear is formed. The sector gear has stop projections 70 at its ends engageable with the ends of the worm 66 to limit the raising and lowering movement of the saw. These stop projections lie in the central plane of the worm and of the row of teeth on the sector gear, so as to avoid twisting strains on the mechanism when the stop projections engage the worm. The shaft 67 extends through an arcuate slot 71 in the front wall of the cabinet and carries a hand-wheel 72 which is detachably keyed thereon. The front trunnion 40 and front trunnion bracket 31 have openings 73 and 74, respectively, to provide clearance for the sector gear 65 when the saw is lowered, the shaft 67 passing through the opening 74. A suitable locking device 90 locks the shaft 67 in adjusted position.

A tubular member or pointer bracket 75 surrounding the shaft 67 is suitably secured to the front trunnion and passes through the openings 74 and 71 in the front trunnion bracket and front cabinet wall. At its front end the tubular member carries a pointer 80 cooperating with an arcuate scale 82 secured to the front wall of the cabinet above the arcuate slot 71 to indicate the angularity of the saw.

The saw arbor is tiltable between limit positions by means of a sector gear 91 formed on the front trunnion 40, Fig. 7, meshing with a worm 92 fast on a horizontal shaft 93 journalled in the lower portion of the front trunnion bracket 31, the shaft being confined against axial movement, as by the worm and a collar 94 engaging opposite ends of a bearing projection 95 of the bracket. The front trunnion 40 with its sector gear 91 is confined against lateral displacement by a hooked guide member 96, Fig. 7, slidably engaginig the gear and rigidly secured by a screw 97 to the front trunnion bracket 31. At opposite ends of the sector gear, 91, the front trunnion, 40, carries adjustable stop screws 98 and 99 which are engageable with stop lugs 100 and 101, respectively, on the front trunnion bracket. These stop screws lie in the vertical plane of the worm shaft 93 and sector gear 91 so as to avoid warping or twisting of the mechanism when the stop screws are brought into engagement with the lugs. The stop screw 98 is engageable with the lug 100 to determine a vertical position of the saw blade, and the stop screw 97 is engageable with the lug 101 to determine an angular position of the saw blade, preferably 45° from the vertical.

The shaft 93 extends through a side wall of the cabinet and has secured thereto a hand-wheel 102 similar to or identical with the hand-wheel 72. The shaft 93 also carries a locking device 106 similar to the locking device for the shaft 67.

The motor 54, in some of its positions, extends through a clearance opening 107 in the adjacent side wall of the cabinet, the opening being normally closed by a dome-shaped cover 108.

The front wall of the cabinet carries a switch box 109, preferably of the double-pole type, which is connected by a flexible conductor cord 112 to a terminal box 113 on the motor. A flexible conductor cord 114 external to the cabinet is also connected to the switch box and is adapted to be plugged into a receptacle.

As the cabinet is almost entirely enclosed, most of the sawdust produced during the use of the machine will be caught in the cabinet. If desired, a blower or suction device, not shown, may be applied to the cabinet to carry off most of the sawdust.

In assembling the machine, the front trunnion bracket 31 is secured to the cabinet and is followed by the carriage or cradle and the rear trunnion bracket 32 which latter is urged forwardly to take up axial play before tightening its clamping screws. Each trunnion bracket, before its bolts 34 are fully tightened, is shiftable through a small distance in any horizontal direction, the flat-bottomed ears 33 of the brackets slidably resting on the horizontal top plate 20 and maintaining the brackets in vertical position. The adjustment of the brackets is thus facilitated, and the bearing portion 35 of the front bracket is readily secured to the vertical side wall of the cabinet without danger of binding or weaving. After the trunnions and carriage are mounted, the pointer bracket 75, hand-wheels and locking knobs are attached, and the motor and wiring are installed. The V-belts 60 are mounted on the arbor pulley by passing them over the forked free end portion of the saw arbor arm or bracket, the forked portion extending below the arbor pulley and between the runs of the belt so as not to interfere with belt changing. The motor is shiftably mounted with respect to the saw arbor so as to facilitate adjustment of belt tension and replacement of the belts.

Figure 1:
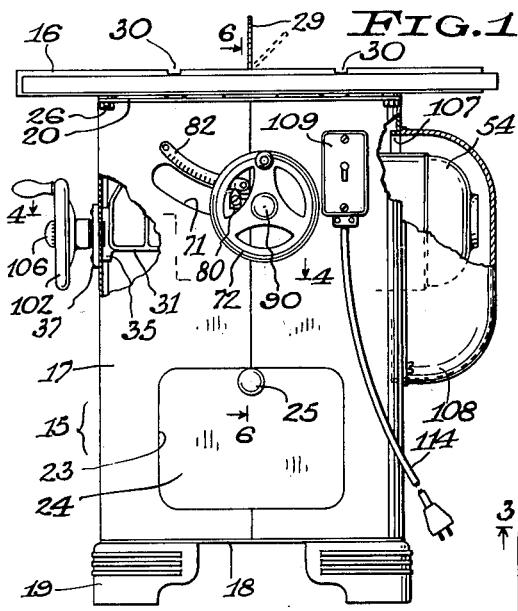
Fig. 1 is a front elevation of the circular saw, parts being broken away and parts being shown in section.
Figure 4:
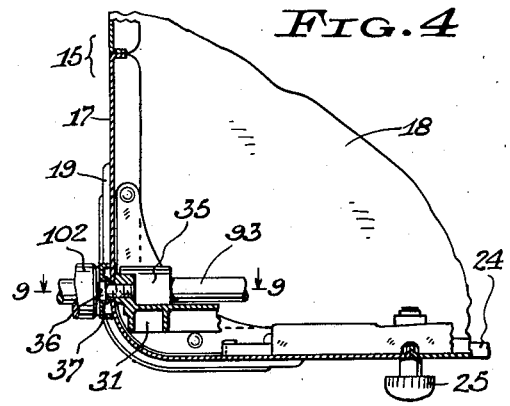
Fig. 4 is a sectional view taken generally along the line 4—4 of Fig. 1.

In the operation of the machine, the saw arbor is belt-driven by the electric motor 54, and work is passed over the table to be cut by the rotating saw blade. To adjust the projection of the saw blade above the table, the saw may be raised or lowered by turning the hand-wheel 72, the adjustment being maintained by operating the locking device 90. The upward and downward travel of the saw is limited by the stop projections 70 on the sector gear 65 striking the ends of the worm 66. When the saw blade is lowered, the adjusting shaft, 67, is accommodated in the space between the plane of the saw blade and the nearest driving belt. The saw blade may be tilted by turning the hand-wheel 102 and is held in adjusted position by the locking device 106, the angular position of the blade being indicated by the pointer 80 cooperating with the scale 82. The tilting travel of the saw is limited by the stop screws 98 and 99 on the front trunnion 40 striking the cooperating stop lugs on the front trunnion bracket 31. The 45° limit position of the saw blade is shown by dotted lines in Fig. 1. The tilting mechanism is carried by the front trunnion bracket, thus insuring accurate assembly and adjustment. The front and rear trunion mountings have their arcuate ribs of substantially different radii, thus considerably reducing any tendency toward warping or weaving.

The table 16 and the trunnion brackets 31 and 32 are rigidly secured to the top plate 20 of the casing at points adjacent to the corners of the casing, which are the regions of maximum stiffness, each trunnion bracket end ear being adjacent to a point of attachment of the table. The top plate provides a smooth and accurate top surface without need for machining. Although the cabinet is of relatively light weight it possesses the requisite rigidity.

While the invention is here shown to be embodied in a circular saw, the invention is also applicable to other machine tools, such as shapers. Various tool elements may be mounted on the arbor, such as molding cutters and abrasive disks.

What I claim as new and desire to secure by Letters Patent is:

1. In a machine tool, the combination of a casing of generally rectangular horizontal cross-section, with substantially vertical corner portions, and having inwardly extending flanges at its top, a mounting plate secured to said flanges, and a work table, a tool carriage completely within said casing, means for tiltably supporting said carriage, including a pair of trunnion brackets extending within said casing adjacent to a pair of opposite sides of the casing, said carriage extending between said brackets and pivotally bearing thereon, each trunnion bracket having opposite end supporting portions resting each on the top of said mounting plate and rigidly secured to said plate adjacent to a corresponding corner portion thereof, and means for securing said table in vertically spaced relationship to said mounting plate, to provide a clearance space above the trunnion brackets and below the under side of the table.

2. In a machine tool, the combination of a casing of generally rectangular horizontal cross-section, made of relatively thin sheet metal, with substantially vertical corner portions, and having inwardly extending flanges at its top, a mounting plate secured to said flanges, said plate being substantially flat and of thicker metal than the casing, a work table, a tool carriage completely within said casing, means for tiltably supporting said carriage, including a pair of trunnion brackets extending within said casing adjacent to a pair of opposite sides of the casing, said carriage extending between said brackets and journalled therein, each trunnion bracket having its opposite end portions resting on the top of said mounting plate and rigidly secured to said plate adjacent to corresponding corner portions thereof, and means for securing said table in vertically spaced relationship to said mounting plate, to provide clearance between the trunnion brackets and the under side of the table.

HERBERT E. TAUTZ.